United States Patent [19]

Aotani et al.

[11] 4,296,015

[45] Oct. 20, 1981

[54] MOLDED ARTICLE OF HYDROUS POLYMER AND PROCESS FOR PRODUCING THE SAME

[75] Inventors: Seiji Aotani, Yokohama; Hisanori Kanayama, Machida, both of Japan

[73] Assignee: Japan Synthetic Rubber Co., Ltd., Tokyo, Japan

[21] Appl. No.: 115,098

[22] Filed: Jan. 24, 1980

[30] Foreign Application Priority Data

Jan. 30, 1979 [JP] Japan .................................. 54/8739

[51] Int. Cl.$^3$ .............................................. C08K 5/06
[52] U.S. Cl. ...................... 260/29.6 ME; 260/23.7 A; 260/29.6 MH; 260/29.6 MM; 260/29.7 GP; 260/29.7 E; 260/29.7 M
[58] Field of Search ................. 260/29.6 S, 29.6 WQ, 260/29.6 PT, 29.6 PS, 29.7 R, 29.7 PT, 28.5 AS, 23.7 A, 29.6 MH, 29.6 ME, 29.6 MM, 29.7 GP, 29.7 E, 29.7 M

[56] References Cited

U.S. PATENT DOCUMENTS

| | | | |
|---|---|---|---|
| 2,120,935 | 6/1938 | Groff | 260/29.6 WQ |
| 2,467,352 | 4/1949 | Williams | 260/29.6 WQ |
| 3,706,696 | 12/1972 | Bernett | 260/29.6 PS |
| 3,809,661 | 5/1974 | Shapero | 260/29.6 PT |
| 4,107,258 | 8/1978 | Angell | 260/29.6 WQ |

FOREIGN PATENT DOCUMENTS 52-65785 5/1977 Japan .
1400424 7/1975 United Kingdom .

OTHER PUBLICATIONS

The Encyclopedia of Chemistry, 3rd Edt. by Hample & Hawley, Van Nostrand Reinhold Co., 1973, p. 615.

*Primary Examiner*—Paul R. Michl
*Attorney, Agent, or Firm*—Oblon, Fisher, Spivak, McClelland & Maier

[57] ABSTRACT

A molded article of hydrous polymer obtained by adding an oily substance to a polymer latex or a macromolecular substance latex containing anionic groups and having a polymer concentration of 20-70% by weight, said latex being selected from the group consisting of (a) polymer latexes prepared by emulsion polymerization process, (b) polymer latexes obtained by re-emulsification process and (c) a latex of a natural macromolecular substance, adding a polyvalent metal compound and/or polyether to the resulting mixture and molding the mixture without heating. Said molded article is a novel one satisfying the following three requirements: (1) it is not deformed even when held in hot water, (2) its tack strength does not change with a change of temperature and (3) it is kept soft even below the freezing temperature of water. It is useful as a material which is kept cool for a long time or as a base for plasters.

22 Claims, No Drawings

MOLDED ARTICLE OF HYDROUS POLYMER AND PROCESS FOR PRODUCING THE SAME

This invention relates to a molded article of hydrous polymer having novel characteristic properties and to a process for producing the same.

As the molded article of hydrous polymer, materials called hydrogel have hitherto been used in various application fields such as lags, materials which are kept cool for a long time, fire-resistant materials, bases for plasters and the like, and various processes have been proposed for producing materials meeting the various requirements in these fields.

However, none of the molded articles of hydrous polymers which have hitherto been put to practical uses or have hitherto been proposed fulfil the following requirements (1)-(3) simultaneously:

(1) it is not deformed even when held in hot water,
(2) its tack strength does not change with a change of temperature, and
(3) it is kept soft even below the freezing temperature of water.

The present inventors have conducted various studies with the aim of obtaining a molded article of hydrous polymer having the above-mentioned requirements simultaneously. As a result, they have succeeded in producing a molded article of hydrous polymer having the above-mentioned requirements simultaneously by this invention.

It is an object of this invention to provide a molded article of hydrous polymer having novel characteristic properties which have not been accomplished by the prior art.

It is another object of this invention to provide a process for producing said novel hydrous polymer.

Other objects and advantages of this invention will become apparent from the following description.

According to this invention, there is provided a molded article of hydrous polymer comprising a polymer latex or a macromolecular substance latex (hereinafter collectively referred to as "polymer latex") containing anionic groups and having a polymer (or macromolecular substance) concentration of 20-70% by weight, said latex being selected from the group consisting of:

(a) polymer latexes produced by emulsion polymerization process,
(b) polymer latexes obtained by re-emulsification process, and
(c) natural macromolecular substance latex, an oily substance, and an additive selected from the group consisting of a polyvalent metal compound, a polyether and a combination of a polyvalent metal compound and a polyether.

Further, according to this invention, said molded article of hydrous polymer is produced by adding an oily substance to said polymer latex containing anionic groups and having a polymer (or macromolecular sustance) concentration of 20-70% by weight, adding a polyvalent metal compund and/or a polyethyer to the resulting mixture, and then molding the mixture thus obtained.

The kind of polymer or macromolecular substance in said polymer latex is not particularly limited.

Specific examples of the polymer used in said polymer latex include polybutadiene, polyisoprene, styrene-butadiene copolymer, styrene-butadiene block copolymer, acrylonitrile-butadiene copolymer, methyl methacrylate-butadiene copolymer, ethylene-propylene copolymer, polychloroprene, isobutylene-isoprene copolymer (butyl rubber), poly-n-butyl acrylate (acryl rubber), polyvinyl chloride, polyvinyl acetate, vinyl acetate-ethylene copolymer and the like.

The term "polymer latexes obtained by re-emulsification process" used in the definition of latex (b) means the latexes produced by dissolving a solid polymer in a solvent immiscible with water, dispersing and emulsifying the resulting solution in water and then removing the solvent. For example, said latex (b) can be produced by dissolving a solid polymer produced by solution polymerization process such as polybutadiene, polyisoprene, styrene-butadiene copolymer, ethylene-propylene copolymer or the like in a solvent such as n-hexane, cyclohexane, methylene chloride, toluene or the like, dispersing and emulsifying the resulting solution by agitating the same in water containing a surfactant such as an alkylarylsulfonate, an alkylsulfate, an alkylsulfonate, a fatty acid soap, a rosin acid soap or the like, and then removing the solvent.

The natural macromolecular substance latexes (c) are naturally occurring macromolecular substance latexes, the representative of which is natural rubber latex.

Among the polymers used in the above polymer latexes (a) and (b), preferable are rubbery polymers and particularly carboxy-modified copolymers produced by subjecting to copolymerization a major amount of at least one monomer selected from the styrene, butadiene, acrylate and methacrylate monomers, and a minor amount, preferably 1-10% by weight, of an unsaturated carboxylic acid.

The polymer latex used may freely be selected from the latexes (a), (b) and (c) in accordance with the properties required in the application field of the molded article of hydrous polymer, such as strength, elastic modulus, tackiness, etc. The polymer latex selected may be used either alone or in combination of two or more, if necessary. Though the polymer concentration in the latex is usually 20-50% by weight, it may be increased up to about 70% by weight by concentrating the latex. Also, water may be added to the latex for the purpose of increasing the water content in the molded article of hydrous polymer.

The polymer latexes containing anionic groups selected from the latexes (a), (b) and (c) involves the following cases:

(1) a case where the polymer (or macromolecular substance) per se has anionic groups;
(2) a case where the surfactant used in the production of the latex has anionic groups;
(3) a case where a substance having anionic groups which acts as an emulsifier is formed in the course of producing the latex and exists in the latex.
(4) a case where the polymer latex contains a water-soluble polymer having anionic groups as a dispersion stabilizer.

As said surfactant having anionic groups, there may be preferably used anionic surfactants generally used in emulsion polymerization such as alkylarylsulfonates, alkylsulfates, alkylsulfonates, fatty acid soaps, rosin acid soap and the like.

The polymer latexes in which the polymer per se has anionic groups can be prepared by a method in which an azo compound having a carboxyl group, a persulfate or the like is used as the polymerization initiator, by a method by which a monomer having an anionic group such as acrylic acid, methacrylic acid, itaconic acid, crotonic acid, vinylbenzenesulfonic acid or the like or maleic anhydride is copolymerized with other monomer or by a method by which an anionic group is introduced into the polymer by a chemical reaction such as partial hydrolysis. Among the methods, the method by which a monomer having an anionic group is copolymerized with other monomers is most general, and this method has an advantage that the amount of anionic groups can be adjusted freely.

Polymer latexes containing a water-soluble polymer having anionic groups as a dispersion stabilizer can also be used advantageously.

Preferably, the polymer latexes are thickened or creamed when processed. In order to thicken or cream them, sodium chloride, ammonium chloride, sodium fluorosilicate, sodium hydroxide, cationic surfactant, sodium alginate, sodium polyacrylate, hydroxyethyl cellulose or the like is added.

As the oily substance, there may be used vegetable oils and fats such as soybean oil, coconut oil, peanut oil, rape seed oil, rice oil, sesame oil, cotton seed oil, linseed oil, castor oil, turpentine oil, orange oil and the like; mineral oils such as a liquid paraffin, vaseline, an aromatic process oil, a naphthenic process oil, and the like; high-boiling esters such as diethyl phthalate, di-n-butyl phthalate, di-2-ethylhexyl phthalate, an alcohol ester of a higher fatty acid, tricresyl phosphate and the like; and the like.

Though the kind of preferable oily substance may be varied depending upon the kind of said polymer, soybean oil, castor oil, liquid paraffin comprising 30-40% of naphthenic hydrocarbons, phthalic esters, and the like are preferable in the case of styrene-butadiene-unsaturated carboxylic acid copolymer. When an oily substance is added to the polymer latex and mixed therewith, there may be added, if necessary, a surfactant, an extender, an antioxidant and the like. The surfactant used in this case may be any of the anionic and nonionic types, among which nonionic surfactants having a HLB value of about 3-9.5 are preferable, though the HLB value is not critical. Examples of said surfactant include higher fatty acid esters of glycerin and sorbitol, terminally esterified or etherified product of polyethylene glycol, and the like. As said extender, inorganic or organic powdery substances which do not coagulate the polymer latexes, may be used such as kaolin, bentonite, talc, calcium carbonate, silica, wheat flour, corn starch and the like.

The mixture obtained by adding an oily substance to the above-mentioned polymer latex is thoroughly homogenized to give a creamy or pasty material.

Subsequently, a polyvalent metal compound and/or a polyether is added. The polyvalent metal compound is not particularly limited, and halides and sulfates of calcium, magnesium, aluminum, zinc and the like, which are used for coagulating polymer latexes, are preferably employed in general. Hydroxides and oxides of these metals are also employed. Preferable polyvalent metal compounds are calcium sulfate, calcium chloride, magnesium sulfate, aluminum chloride, aluminum sulfate, calcium hydroxide, calcium oxide, zinc oxide and the like. Preferably, the polyvalent metal compound is used in a readily miscible form, such as the form of a dispersion in water or in the oily substance, the form of an aqueous solution, the form of an emulsion of an aqueous solution in the oily substance, or the like. The polyvalent metal compound may be used either alone or in combination of two or more. A combination of calcium sulfate and zinc oxide is particularly preferable. The ultimate mixture obtained by adding the polyvalent metal compound is a mass lacking fluidity. The polyvalent metal compound may be replaced by polyethers. As the polyether, there may be used polyoxypropylene, oxyethylene-oxypropylene copolymer, polyoxytetramethylene and the like. These polyethers have 1-6 terminal hydroxyl groups. Polyoxypropylene is a preferable polyether, and it has particularly preferably a molecular weight of 1,000-6,000. When the polyether is used, a copolymer of 1-10% by weight of an unsaturated carboxylic acid and other monomers is preferred as the polymer in the polymer latex, and the latex has preferably a pH of 3-7. In particular, the shape-retaining property and water-separation of the mass obtained can be further improved by using the polyvalent metal compound and the polyether together. Though the time required for reaching the mass are varied depending on the kind of the materials used, the mixture is molded into the desired shape in accordance with the purpose of using the final product before the mixture loses its fluidity. For example, the molding may be effected by packing the mixture into a bag having a necessary shape, by spreading it onto the other elementary materials (coating the mixture onto a base cloth in the case of a plaster base or the like), before the mixture loses its fluidity.

The time required for converting the mixture into a mass is controlled by selecting an appropriate polyvalent metal compound and/or a polyether, or by controlling the amount of the polyvalent metal compound and/or the polyether. It can also be controlled by adding an alkaline salt of phosphoric acid or polymerized phosphoric acid.

When the polyvalent metal compound is sparingly soluble, its solubility can be improved by adding an acid thereto.

When the polyether is used, the time required for reaching the mass may be adjusted by varying the amount and the molecular weight of the polyether.

Though any proportion of the polymer latex to the other substances added may be selected, it is preferable that the oily substance is used in a proportion of 10-200 parts by weight, and the polyvalent metal compound is used in a proportion of 0.01-10 parts by weight and/or the polyether is used in a proportion of 0.5-30 parts by weight, per 100 parts by weight of the polymer latex. The above-mentioned amount of the polyvalent metal compound does not involve the amount of the metal compound used as extender. If the amount of the oily substance exceeds 200 parts by weight, the molded article of hydrous polymer obtained is too soft and becomes poor in shape-retaining property or the oily substance exudates from the molded article of hydrous polymer obtained. If the amount of the oily substance is less than 10 parts by weight, water readily separates from the molded article. If the amount of polyvalent metal compound exceeds 10 parts by weight, the fluidity is lost in a short period of time, so that molding becomes difficult, and the molded article has the property that water tends to be separated. When the polyether is used in an amount of more than 30 parts by weight, though may be used, the oily substance tends to separate from the molded article. More preferably, the oily substance is used in the range of 20-150 parts by weight and the polyvalent metal compound is used in the range of 0.1-5 parts by weight and/or the polyether is used in the range of 1-20 parts by weight, per 100 parts by weight of the polymer latex.

In the production process of this invention, medical ingredients, perfumes, storage stabilizers and the like may be added in the course of the process.

The molded article of hydrous polymer obtained by this invention has the following characteristic features which are not found in the same kind of articles hitherto known:

(1) It is not deformed even when held in hot water.

(2) Its tack strength does not change with a change of temperature.

(3) Its elasticity does not so much change with a change of temperature.

(4) It is kept soft even below the freezing temperature of water.

(5) Water is not separated even in the repeated high temperature-low temperature cycle.

(6) It can easily be processed and molded at room temperature.

(7) Volatile additives such as medical agents, perfumes and the like can be added to it in the course of molding, and can be prevented from being escaped away.

The characteristic features mentioned above demonstrate that the molded article of hydrous polymer obtained by this invention has markedly excellent properties as a material which is kept cool for a long time. Particularly when used as a base for plasters, the molded article of hydrous polymer obtained by this invention has the following advantages:

(1) It is produced at room temperature, so that there is no loss of medical ingredients due to vaporization.

(2) The base material per se has an appropriate tackiness, so that no other tackifiers are necessary to use.

(3) The base material per se has an appropriate tackiness, so that the human skin is not injured when the plaster is peeled therefrom.

(4) The water vaporizes gradually over a long period of time, so that it is excellent in cooling effect and gives an anit-inflammatory effect over a long period of time.

(5) It is soft and well follows the shape of a substrate to which it adheres. (It well follows the bending and stretching of human skin.)

(6) The elasticity does not so much change with a change of temperature.

(7) Water does not separate in the form of a drop from the molded article.

(8) It has no unpleasant feeling of tackiness even at high temperatures (in the summer season or when the affected part is in fever).

This invention is illustrated with reference to Examples. These Examples are only by way of illustration and not by way of limitation.

EXAMPLE 1

With 30 parts by weight of liquid paraffin was mixed 100 parts by weight of a styrene-butadiene copolymer latex (pH 9.5; solid content 50% by weight) prepared by emulsion-polymerization using an anionic surfactant by emulsion-polymerization using an anionic surfactant (a fatty acid soap) at room temperature for 30 minutes to obtain a pasty material. Then, 1 part by weight of calcium sulfate was mixed therewith at room temperature for about 1 minute. By means of a doctor blade, the mixture was formed into a sheet having a thickness of 2 mm. The sheet lost its fluidity in about 30 minutes to become a soft, hydrous polymer sheet having a rubber elasticity. From this hydrous polymer sheet was separated no water in the form of a drop and neither volume change nor surface tackiness were observed even after the sheet was immersed in water at 30° C. for 48 hours.

EXAMPLE 2

There were mixed together 80 parts by weight of a styrene-butadiene-acrylic acid copolymer (amount of reacted acrylic acid 3% by weight) latex (pH 6.8; solid content 50% by weight), 20 parts by weight of a styrene-butadiene-methyl methacrylate-acrylic acid copolymer (amount of reacted acrylic acid 4% by weight) latex (pH 8; solid content 50% by weight), 1 part by weight of carboxymethyl cellulose, 30 parts by weight of castor oil, 6 parts by weight of methyl salicylate, 5 parts by weight of l-menthol and 2 parts by weight of thymol at room temperature for 30 minutes to obtain a pasty material. Then, a mixture consisting of 2 parts by weight of liquid paraffin, 1 part by weight of calcium sulfate and 0.5 part of weight of zinc oxide was mixed with the above-mentioned pasty material at room temperature for 2 minutes. Then, the mixture thus obtained was spread in a thickness of 1 mm on a flannel cloth. The mixture lost its fluidity in about 1 hour to become a hydrous polymer sheet. This hydrous polymer sheet was suitable for use as a fomentation because it well adhered to human skin, its tackiness did not change with a change of temperature and humidity, it did not injure the human skin when it was peeled therefrom, and it was excellent in fomenting effect.

EXAMPLE 3

There were mixed together 100 parts by weight of a polybutadiene latex (pH 10.5; solid content 53% by weight) prepared by emulsion polymerization using an anionic surfactant (a fatty acid soap), 10 parts by weight of 2% by weight aqueous solution of sodium polyacrylate, 30 parts by weight of liquid paraffin, 5 parts by weight of methyl salicylate, 5 parts by weight of l-menthol and 2 parts by weight of thymol at room temperature for 30 minutes to obtain a pasty material. Then, a mixture consisting of 2 parts by weight of 10% by weight aqueous solution of calcium chloride and 0.3 part by weight of sodium tripolyphosphate was mixed therewith for one minute, after which the mixture thus obtained was spread in a thickness of 1 mm on a flannel cloth. The mixture lost is fluidity in about 10 minutes to become a hydrous polymer sheet. This hydrous polymer sheet was suitable for use as a fomentation because it well adhered to human skin, its tackiness did not change with a change of temperature and humidity, it did not injure the human skin when the sheet was peeled from the human skin, and it was excellent in fomenting effect.

EXAMPLE 4

There were mixed together 100 parts by weight of a styrene-butadiene-acrylic acid copolymer (amount of reacted acrylic acid 5% by weight) latex (pH 9.0; solid content 50% by weight), 1 part by weight of sodium alginate, 20 parts by weight of soybean oil and 0.5 part by weight of nonionic surfactant (polyoxyethylene stearyl ether; HLB=9.4) at room temperature for 15 minutes to obtain a pasty material. Then, 1 part by weight of calcium sulfate was mixed therewith at room temperature for 2 minutes, and the mixture thus obtained was pressed and formed into a sheet having a thickness of 8 mm. This molded article lost its fluidity in about 15 minutes to become a soft and tough hydrous polymer sheet. When this hydrous polymer sheet was stored at −20° C. for 24 hours, it did not lose its softness. When returned to room temperature, water was not separated from the sheet. When 100 g of this hydrous polymer was stored at −17° C. for 3 hours and then allowed to stand at 25° C., it was maintained at a temperature of 0° C. or lower for 80 minutes, demonstrating that this hydrous polymer was suitable for use as a material which is kept cool over a long time.

EXAMPLE 5

100 parts by weight of a 5% by weight solution of styrene-butadiene copolymer (styrene content=23.5% by weight, Mooney viscosity $ML_{1+4}$ at 100° C.=110, gel content=0%) in toluene was emulsified with 300 parts by weight of 1% by weight aqueous solution of sodium lauryl sulfate, and the toluene was removed by vaporization, after which the residue was concentrated to obtain a latex having a solid content of 53% by weight. There were mixed together 80 parts by weight of the above-mentioned latex, 20 parts by weight of a styrene-butadiene copolymer latex (pH 10; solid content 69% by weight) obtained by polymerization with an anionic surfactant (a fatty acid soap), 70 parts by weight of aromatic process oil, 10 parts by weight of polyoxypropylene (molecular weight 4,000) and 2 parts by weight of a nonionic surfactant (sorbitane monooleate; HLB=4.3) at room temperature for 30 minutes to obtain a pasty material. Then, 10 parts by weight of 10% by weight aqueous solution of magnesium sulfate was mixed therewith at room temperature for 5 minutes, and the mixture thus obtained was packed into a polyethylene bag. The mixture lost its fluidity in about 30 minutes to become a hydrous polymer having the shape of the bag. The hydrous polymer sealed into the polyethylene bag was suitable for use as a material which is kept cool over a long time, because it was kept soft even at −20° C., showed no change in appearance and hardness even if maintained at 50° C. for one week, and showed no visible change even after a heat cycle of 45° C. for 12 hours and −15° C. for 12 hours was repeated 10 times.

EXAMPLE 6

With 100 parts by weight of natural rubber latex (pH 10) were mixed 10 parts by weight of 10% by weight aqueous sodium alginate solution, 50 parts by weight of soybean oil and 10 parts by weight of liquid paraffin at room temperature for 30 minutes to form a pasty material. To this pasty material was added a mixture of 2 parts by weight of polyoxypropylene (molecular weight, 4,000) and 1 part by weight of calcium sulfate, and the resulting mixture was mixed and extruded continuously by means of a screw type extruder to fill a polyethylene bag with the mixture. The mixture in the bag lost its fluidity in 5 minutes to become a hydrous polymer having the same performance as in Example 5.

EXAMPLE 7

With 30 parts by weight of a polyvinyl acetate latex (pH 4.8; solid content 44% by weight) obtained by emulsion polymerization with an alkylarylsulfonate were mixed 80 parts by weight of a styrene-butadiene-acrylic acid copolymer (amount of reacted acrylic acid 5% by weight) latex (pH 5; solid content 50% by weight), 1 part by weight of sodium alginate, 20 parts by weight of kaolin, 40 parts by weight of soybean oil, 5 parts by weight of methyl salicylate, 5 parts by weight of l-menthol and 5 parts by weight of dl-camphor at room temperature for 30 minutes to form a pasty material. To this pasty material were added 2 parts by weight of polyoxypropylene (molecular weight 4,000) and 1 part by weight of calcium sulfate, and the resulting mixture was agitated for 5 minutes, and then spread in a thickness of 1 mm on a flannel cloth. The mixture lost its fluidity in one hour to become a hydrous polymer having the same performance as in Example 2.

EXAMPLES 8 to 9

The composition shown in the following Table was mixed at room temperature for 30 minutes to form a creamy material, and 10 parts by weight of polyoxypropylene (molecular weight 1,000), 4 parts by weight of calcium sulfate and 1 part by weight of zinc oxide were added thereto, after which the resulting mixture was agitated for 5 minutes. This mixture was formed into a sheet having a thickness of 2 mm, which lost its fluidity in 20 minutes to become a hydrous polymer having the same performance as in Example 1.

TABLE

|  | Example 8 | Example 9 |
|---|---|---|
| Styrene-butadiene-acrylic acid copolymer latex* (parts by weight) | 100 | 100 |
| Dibutyl phthalate (parts by weight) | 30 | 0 |
| Turpentine oil (parts by weight) | 0 | 30 |
| Sodium alginate (parts by Weight) | 1 | 1 |

Note:
*Amount of reacted acrylic acid in the copolymer 5% by weight; pH 6; solid content 50% by weight.

EXAMPLE 10

With 100 parts by weight of a styrene-butadiene-acrylic acid copolymer (amount of reacted acrylic acid 5% by weight) latex (pH 5; solid content 50% by weight) were mixed 1 part by weight of sodium alginate and 50 parts by weight of soybean oil at room temperature for 30 minutes to form a creamy material, to which 1 part by weight of polyoxypropylene (molecular weight 4,000), 1 part by weight of aluminum hydroxide, 0.5 part by weight of malic acid and 2 parts by weight of water were added, and the mixture was stirred for 2 minutes, and then formed into a sheet having a thickness of 2 mm. This sheet lost its fluidity in 30 minutes to become a hydrous polymer having the same performance as in Example 1.

EXAMPLE 11

With 100 parts by weight of a styrene-butadiene-acrylic acid copolymer (amount of reacted acrylic acid 5% by weight) latex (pH 5; solid content 50% by weight) were mixed 1 part by weight of sodium alginate, 30 parts by weight of soybean oil and 20 parts by weight of calcium carbonate at room temperature for 30 minutes to form a creamy material, after which 10 parts by weight of polyoxypropylene (molecular weight 1,000) and 2 parts by weight of 10% by weight aqueous stannic chloride solution were added to the cream and the resulting mixture was agitated for 2 minutes. The resulting mixture was formed into a sheet having a thickness of 2 mm. This sheet lost its fluidity in 10 minutes to become a hydrous polymer having the same performance as in Example 1.

EXAMPLE 12

With 100 parts by weight of a styrene-butadiene-methyl methacrylate-methacrylic acid copolymer (amount of reacted acrylic acid 5% by weight) latex (pH 5; solid content 50% by weight) were mixed 30 parts by weight of soybean oil and 1 part by weight of sodium alginate at room temperature for 30 minutes to form a pasty material. To this pasty material were added 10 parts by weight of polyoxypropylene (molecular weight 1,000) and 1 part by weight of calcium sulfate, and the mixture was agitated at room temperature for 2 minutes, and then formed into a sheet having a thickness of 2 mm. This sheet lost its fluidity in about 10 minutes to become a soft, tough, hydrous polymer having the same performance as in Example 1.

EXAMPLE 13

With 100 parts by weight of a styrene-butadiene-methyl methacrylate-acrylic acid copolymer (amount of reacted acrylic acid 5% by weight) latex (pH 5; solid content 50% by weight) were mixed 30 parts by weight of soybean oil and 1 part by weight of sodium alginate at room temperature for 30 minutes to form a pasty material. With this pasty material were mixed 10 parts by weight of an oxyethylene-oxypropylene copolymer (molecular weight 3,000) and 1 part by weight of calcium sulfate at room temperature for 2 minutes, and the resulting mixture was formed into a sheet having a thickness of 2 mm. This sheet lost is fluidity in about 30 minutes to become a soft, tough, hydrous polymer having the same performance as in Example 1.

EXAMPLE 14

With 100 parts by weight of a styrene-butadiene-methyl methacrylate-acrylic acid copolymer (amount of reacted acrylic acid 5% by weight) latex (pH 5; solid content 50% by weight) were mixed 30 parts by weight of soybean oil and 1 part by weight of sodium alginate at room temperature for 30 minutes to form a pasty material. With this pasty material were mixed 10 parts by weight a polyoxytetramethylene (molecular weight 2,000) and 1 part by weight of calcium sulfate at room temperature for 2 minutes, and the resulting mixture was formed into a sheet having a thickness of 2 mm. This sheet lost its fluidity in about 10 minutes to become a soft, tough, hydrous polymer having the same performance as in Example 1.

EXAMPLE 15

With 100 parts by weight of a styrene-butadiene-acrylic acid copolymer (amount of reacted acrylic acid 7% by weight) latex (pH 5; solid content 50% by weight) were mixed 20 parts by weight of kaolin, 1 part by weight of sodium alginate, 30 parts by weight of soybean oil, 5 parts by weight of methyl salicylate, 5 parts by weight of l-menthol and 5 parts by weight of dl-camphor at room temperature for 30 minutes to form a creamy material. With this creamy material was mixed 4 parts by weight of polyoxypropylene (molecular weight 4,000) for 5 minutes, and the resulting mixture was spread in a thickness of 1 mm on a flannel cloth. The mixture lost its fluidity in about 30 minutes to become a hydrous polymer having the same performance as in Example 2.

What is claimed is:

1. A molded article of hydrous polymer comprising a polymer latex or a macromolecular substance latex, an oily substance, and an additive selected from the group consisting of a polyether and a combination of a polyvalent metal compound and a polyether, said polymer latex or macromolecular substance latex containing anionic groups, having a polymer concentration of 20-70% by weight, and being selected from the group consisting of:
   (a) polymer latexes prepared by emulsion polymerization process,
   (b) polymer latexes obtained by re-emulsification process, and
   (c) natural macromolecular substance latexes;
   wherein said polyether is selected from the group consisting of polyoxypropylene, oxyethylene-oxypropylene copolymer and polyoxytetramethylene; and
   wherein the amounts of the oily substance and the polyether are 10-200 parts by weight and 0.5-30 parts by weight, respectively, per 100 parts by weight of said polymer latex.

2. A molded article of hydrous polymer according to claim 1, wherein the additive is a polyether.

3. A molded article of hydrous polymer according to claim 1, wherein the additive is a combination of a polyvalent metal compound and a polyether.

4. A molded article of hydrous polymer according to claim 1, 2 or 3, wherein the polymer in said polymer latex is selected from the group consisting of polybutadiene, polyisoprene, styrene-butadiene copolymer, styrene-butadiene block copolymer, acrylonitrile-butadiene copolymer, methyl methacrylate-butadiene copolymer, ethylene-propylene copolymer, polychloroprene, isobutylene-isoprene copolymer, poly-n-butyl acrylate, polyvinyl chloride, polyvinyl acetate, and vinyl acetate-ethylene copolymer.

5. A molded article of hydrous polymer according to claim 1, 2 or 3, wherein said polymer is a copolymer of an unsaturated carboxylic acid and at least one monomer selected from the group consisting of styrene, butadiene, acrylates and methacrylates.

6. A molded article of hydrous polymer according to claim 1, 2 or 3, wherein said oily substance is at least one member selected from the group consisting of soybean oil, coconut oil, peanut oil, rape seed oil, rice oil, sesame oil, cotton seed oil, linseed oil, castor oil, turpentine oil, orange oil, a liquid paraffin, vaseline, an aromatic process oil, a naphthenic process oil, diethyl phthalate, di-n-butyl phthalate, di-2-ethylhexyl phthalate, an alcohol ester of a higher fatty acid, and tricresyl phosphate.

7. A molded article of hydrous polymer according to claim 1, wherein said polyvalent metal compound is at least one member selected from the group consisting of calcium sulfate, calcium chloride, magnesium sulfate, aluminum chloride, aluminum sulfate, calcium hydroxide, calcium oxide and zinc oxide.

8. A molded article of hydrous polymer according to claim 6, wherein said polyvalent metal compound is a combination of calcium sulfate and zinc oxide.

9. A molded article of hydrous polymer according to claim 5, wherein the polyether is polyoxypropylene.

10. A molded article of hydrous polymer according to claim 2, wherein the polymer in the polymer latex has a content of the unsaturated carboxylic acid reacted of 1-10% by weight.

11. A molded article of hydrous polymer according to claim 10, wherein the polymer latex has a pH of 3-6.

12. A molded article of hydrous polymer according to claim 1 or 3, wherein the amounts of the oily substance and the polyvalent metal compound are 10-200 parts by weight and 0.01-10 parts by weight, respectively, per 100 parts by weight of the polymer latex.

13. A molded article of hydrous polymer according to claim 1 or 3, wherein the amounts of the oily substance and the polyvalent metal compound are 20-150 parts by weight and 0.1-5 parts by weight, respectively, per 100 parts by weight of the polymer latex.

14. A molded article of hydrous polymer according to claim 10 or 11, wherein the amounts of the oily substance and the polyether are 20-150 parts by weight and 1-20 parts by weight, respectively, per 100 parts by weight of the polymer latex.

15. A molded article of hydrous polymer according to claim 14, wherein the polyether has a molecular weight of 1,000-6,000.

16. A process for producing a molded article of hydrous polymer which comprises adding an oily substance to a polymer latex or a macromolecular substance latex containing anionic groups, having a polymer concentration of 20-70% by weight and selected from the group consisting of:
(a) polymer latexes prepared by emulsion polymerization process,
(b) polymer latexes obtained by re-emulsification process, and
(c) natural macromolecular substance latexes,
adding to the resulting mixture an additive selected from the group consisting of a polyether and a combination of a polyvalent metal compound and a polyether, and molding the mixture obtained without heating;
wherein said polyether is selected from the group consisting of polyoxypropylene, oxyethylene-oxypropylene copolymer and polyoxytetramethylene, and
wherein the amounts of the oily substance and the polyether are 10-200 parts by weight and 0.5-30 parts by weight, respectively, per 100 parts by weight of said polymer latex.

17. A process according to claim 16, wherein the additive is a polyether.

18. A process according to claim 16, wherein the additive is a combination of a polyvalent metal compound and a polyether.

19. A process according to claim 16, 17 or 18, wherein a surfactant, an extender and an antioxidant are added to the mixture of the polymer latex and the oily substance.

20. A process according to claim 16, 17 or 18, wherein the mixture is thoroughly homogenized and made creamy or pasty.

21. A process according to claim 16 or 18, wherein said polyvalent metal compound is added in the form of a dispersion in water or an oily substance, in the form of a solution in water or in the form of an emulsion of an aqueous solution in an oily substance.

22. A process according to claim 16, 17 or 18, wherein the mixture of the polymer latex, the oily substance and the additive is molded at room temperature into the necessary shape before it loses its fluidity.

* * * * *